Patented Sept. 20, 1932

1,877,899

UNITED STATES PATENT OFFICE

GEORG KRÄNZLEIN, MARTIN CORELL, AND HEINRICH VOLLMANN, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

VAT DYESTUFFS OF THE DIBENZPYRENEQUINONE SERIES

No Drawing. Application filed August 18, 1931, Serial No. 557,944, and in Germany July 6, 1929.

The present invention relates to vat dyestuffs of the dibenzpyrenequinone series.

This application is a continuation-in-part application of our copending application Serial No. 464,422.

We have found that valuable dyestuffs and intermediate products are obtainable by wholly or partly diazotizing the amino groups in mono- or polyamino-dibenzpyrenequinones of the general probable formula:

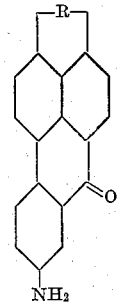

wherein R represents the bivalent radical

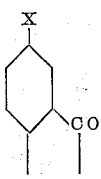

X standing for hydrogen or an amino group, and replacing them by another univalent residue or replacing one or both hydrogen atoms of the NH$_2$ groups by a radical. The mono- or polyamino-dibenzpyrenequinones used as starting materials in the present process may be prepared by causing a nitrating agent to react with a dibenzpyrenequinone or isodibenzpyrenequinone and reducing the nitro compound thus obtained to the corresponding amino compound as described in our copending application Serial No. 342,660.

The products obtained according to the present invention which correspond with the general probable formula:

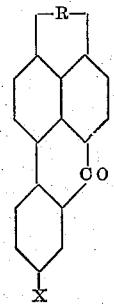

wherein R represents the bivalent radical

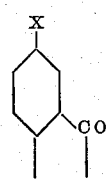

and X stands for a substituent of the group consisting of —OH, —OCH$_3$, —OC$_2$H$_5$ and NH.CO aryl, are to be considered as new.

The following examples serve to illustrate the invention, but they are not intended to limit it thereto, the parts being by weight:

(1) 10 parts of diamino-3.4.8.9-dibenzpyrenequinone obtainable according to Example 1 or 2 of our copending application Serial No. 342,660 are heated to boiling in 150 parts of nitrobenzene, and 10 parts of benzoyl chloride are gradually entered into the boiling suspension drop by drop. Solution takes place for a short time, the brownish-red dibenzoyl derivative then separates even at boiling temperature. Still warm, it is filtered by suction and washed with alcohol. The dyestuff, thus prepared, yields from a red intensely yellowish-red dyeings of good fastness properties. It has the probable formula:

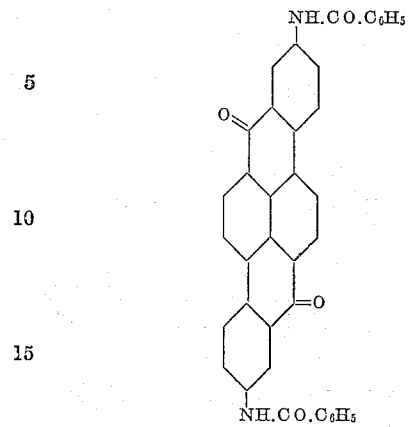

(2) 35 parts of mono-amino-4.5.8.9-dibenzpyrenequinone, obtainable according to Example 6 of our copending application Serial No. 342,660, are heated to boiling in 350 parts of dimethylanaline and 20 parts of benzoyl chloride are gradually run in drop by drop. The mono-benzoyl-amino-4.5.8.9-dibenzpyrenequinone separates in the form of small needles. It dissolves in concentrated sulfuric acid to a yellowish-green solution. The dyestuff yields from an orange vat a covered violet dyeing of good fastness properties.

(3) 18 parts of diamino-3.4.8.9-dibenzpyrenequinone-5.10, as described in Example 1, are heated to boiling with 30 parts of anthraquinone-2-carboxylic acid chloride in 500 parts of nitrobenzene, until any unaltered diamine can no longer be detected. After cooling, the whole is filtered by suction and washed with hot alcohol. The crystalline reddish-brown powder, thus obtained, dissolves in concentrated sulfuric acid to a red solution. The dyestuff dyes cotton from the vat fast brownish red tints.

(4) 72 parts of diamino-3.4.8.9-dibenzpyrenequinone-5.10, as described in Example 1, are dissolved in 1000 parts of concentrated sulfuric acid. The solution is then cooled to 0° C.–5° C. and is gradually mixed with 30 parts of solid sodium nitrite. The whole is first stirred for 5 hours at ordinary temperature and is subsequently heated for one hour to 125° C. By pouring the solution into water reddish-brown flakes of dihydroxy-dibenzpyrenequinone precipitate which dissolve in hot diluted alkali to a blue solution. This compound is not identical with 1.6-dihydroxy-3.4.8.9-dibenzpyrenequinone described in U. S. Patent No. 1,693,447.

40 parts of the dihydroxy derivative thus obtained are heated to boiling during 30 minutes with 500 parts of nitrobenzene and 40 parts of sodium carbonate, then 100 parts of toluene sulfonic acid methyl ester are added at about 180° C. A reddish-orange solution is gradually formed. After stirring during 2 hours at 185° C. the solution is filtered hot. The dimethoxydibenzpyrenequinone of the probable formula:

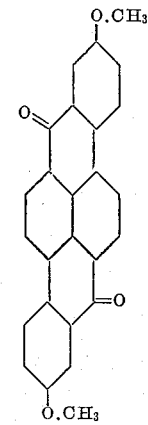

separates out of the filtrate in the form of small brownish-red needles. It dissolves in concentrated sulfuric acid to a greenish-blue solution. The dyestuff dyes cotton from a bluish-red vat intensely brownish-red tints.

By using instead of methyl-ester, toluolsulfonic acid-ethyl-ester, there is obtained a diethoxy-dibenzpyrenequinone having similar properties as the methoxy compound.

(5) 11 parts of sodium nitrite are added at ordinary temperature, while well stirring, to a solution of 50 parts of mono-amino-4.5.8.9-dibenzpyrenequinone, as described in Example 2, in 750 parts of concentrated sulfuric acid. After the diazotization is complete, the whole is cautiously poured upon ice, filtered by suction and the diazonium compound obtained is washed with cold water until neutral.

(5a) The diazonium sulfate thus obtained is given in small amounts into a boiling solution of 40 parts of cuprous chloride and 360 parts of diluted hydrochloric acid 1:1, heating is continued for about 20 minutes. After filtering by suction and drying, the dyestuff is boiled out with chlorobenzene and recrystallized from nitrobenzene. It is a crystalline powder of bluish-red needles, soluble in concentrated sulfuric acid to a yellowish-brown solution and dyeing cotton from a red vat a bluish-red tint.

(5b) The diazonium sulfate, made in the manner above described, is suspended with a small quantity of water, mixed with 30 parts of copper-powder and 50 parts of potassium bromide and boiled for about 30 minutes. The crude product is dried as described in the preceding paragraph and recrystallized from nitrobenzene. The mono bromiso-dibenzpyrenequinone crystallizes in the form of bluish-red needles and dyes cotton in an orange vat bluish-red tints.

(5c) The paste of diazonium sulfate is given in small amounts into a clear solution of potassium cuprocyanide, prepared of 30 parts of cuprous cyanide in 1000 parts of water and so much potassium cyanide that a clear solution is obtained. After about 1 hour's boiling, the monocyano-4.5.8.9-dibenzpyrenequinone thus formed is filtered by suction, dried and recrystallized from nitrobenzene. It dissolves in concentrated sulfuric acid to a green solution and dyes cotton in a red vat reddish-orange tints.

(6) 150 parts of diamino-3.4.8.9-dibenzpyrenequinone are heated to boiling under reflux for 24 hours with 200 parts of benzotrichloride and 50 parts of sulfur in 3000 parts of α-naphthalene chloride. Thereupon the reaction product is filtered by suction and washed with hot alcohol. The dyestuff obtained, the dithiazol-3.4.8.9-dibenzpyrenequinone, dissolves in concentrated sulfuric acid to a violet solution and dyes cotton in a violet-red vat red tints of good fastness properties.

We claim:

1. As new products, the compounds of the general probable formula:

[chemical structure with R and X substituents, containing CO group]

wherein R represents the bivalent radical

[chemical structure with X substituent and CO group]

and X stands for a substituent of the group consisting of —OH, —OCH$_3$, —OC$_2$H$_5$ and NH.CO aryl.

2. As a new product, the compound of the following probable formula:

[chemical structure with two O.CH$_3$ groups]

forming small brownish-red needles, dissolving in concentrated sulfuric acid to a greenish-blue solution and dyeing cotton from a bluish-red vat intensely brownish-red tints.

3. As a new product, the compound of the following probable formula:

[chemical structure with two NH.CO.C$_6$H$_5$ groups]

forming a brownish-red product which dyes cotton from a red vat intensely yellowish-red tints.

4. As a new product, the compound of the following probable formula:

[chemical structure with two NH.CO- anthraquinone groups]

forming a reddish-brown powder dissolving in concentrated sulfuric acid to a red solution and dyeing cotton from the vat fast brownish-red tints.

In testimony whereof, we affix our signatures.

GEORG KRÄNZLEIN.
MARTIN CORELL.
HEINRICH VOLLMANN.